United States Patent
Takamizawa et al.

[11] 3,889,227
[45] June 10, 1975

[54] ULTRASONIC WAVE RECEIVING APPARATUS

[75] Inventors: Kinya Takamizawa; Kazuhiro Iinuma, both of Yokohama, Japan

[73] Assignee: Tokyo Shibaura Electric Co., Ltd., Japan

[22] Filed: Sept. 18, 1973

[21] Appl. No.: 398,314

[30] Foreign Application Priority Data
Feb. 13, 1973 Japan.............................. 48-17114

[52] U.S. Cl............ 340/6 R; 340/16 R; 343/100 LE
[51] Int. Cl............................................... G01s 3/80
[58] Field of Search..... 340/6 R, 16 R; 343/100 LE, 343/113 R

[56] References Cited
UNITED STATES PATENTS
3,500,414  3/1970  Woerrlein....................... 343/113 R

*Primary Examiner*—Richard A. Farley
*Attorney, Agent, or Firm*—Oblon, Fisher, Spivak, McClelland & Maier

[57] ABSTRACT

An ultrasonic wave receiving apparatus which comprises an electroacoustic transducer array consisting of a plurality of transducer elements, any two of which are arranged in the same plane for an integral multiple of a prescribed distance; a signal processing circuit which includes a multiplicative circuit, an extracting circuit for extracting the D.C. component of an output from the multiplicative circuit, a gain controlling circuit, and an adder, and process an output signal from each transducer element so as to cause the subject apparatus to indicate a directionality approximating a prescribed pattern. The prescribed distance is determined by reference to the angle between the main lobe and an adjacent grating lobe of the prescribed directionality. The gain of the gain controlling circuit is set according to the coefficients of the Fourier series into which the preset directionality is expanded as a function of the incident angle of ultrasonic waves brought to the electroacoustic transducer array.

5 Claims, 12 Drawing Figures

$$A_n = \frac{2}{8} \frac{\sin(n\pi/8)}{n\pi/8}$$

ULTRASONIC WAVE RECEIVING APPARATUS

This invention relates to an ultrasonic wave receiving apparatus and more particularly to a receiving apparatus having a directionality improved by subjecting output signals from the respective transducer elements to proper processing.

With an ultrasonic wave receiving apparatus, demand has been made to improve its directionality characteristics. However, the prior art has presented difficulties in saving the directionality of the apparatus from any side lobe and reducing the width of the main lobe thereof. The occurence of the side lobe leads to a false image, and a wide main lobe decreases the capacity of the apparatus to detect the direction in which ultrasonic waves are brought to the apparatus. Though it may be possible to prevent the appearance of a side lobe and narrow the width of a main lobe by providing a larger number of transducer elements constituting the electroacoustic transducer array of an ultrasonic wave receiving apparatus, yet an ultrasonic wave receiving apparatus having such numerous transducer elements would be difficult to realize due to the unavoidable bulkiness.

Figure 1:
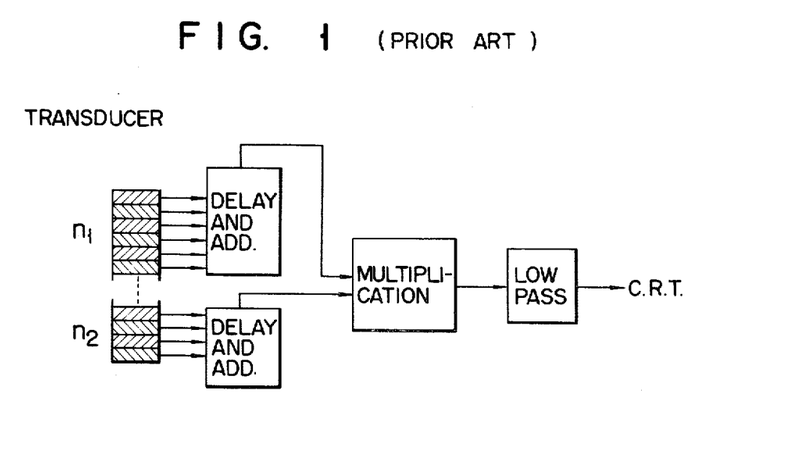
FIG. 1 is a block circuit diagram of the prior art ultrasonic wave receiving apparatus having a multiplicative circuit added to a circuit for processing output signals from transducer elements.

V. G. Welsby et al attempted to resolve the above-mentioned difficulties by adding a multiplicative circuit to a circuit for processing output signals from the transducer elements or signals generated by receiving an ultrasonic wave (refer to "Multiplicative Receiving Arrays" by V. G. Welsby and D. G. Tuke, J. Brit. IRE. 19; pp 369 to 382, June 1959). There will now be outlined his proposed process by reference to FIG. 1 showing the prior art. The electroacoustic transducer array (hereinafter referred to as the "transducer array") is divided into a group of transducer elements having a number of $n_1$ and another group of transducer elements having a number of $n_2$. Output signals from all the transducer elements are delayed for a prescribed length of time through respective delay line and added together by an adder provided for each group. Output signals from the adders are multiplied by a multiplicative circuit. An output from the multiplicative circuit passes through a low pass filter or wave detection circuit to have its D.C. component extracted. An output signal from the low pass filter is conducted to, for example, a cathode ray tube. With $n_1$ taken to denote three transducer elements and $n_2$ two transducer elements, the directionalily of the prior art ultrasonic wave receiving apparatus will have a theoretical value indicated in a solid line in FIG. 2. The broken line of FIG. 2 presents the theoretical value of the directionality of said apparatus obtained by delaying output signals from the five transducer elements for a prescribed length of time, simply adding them together and finally conducting them through a wave detection circuit (without subjecting them to multiplication).

Figure 2:
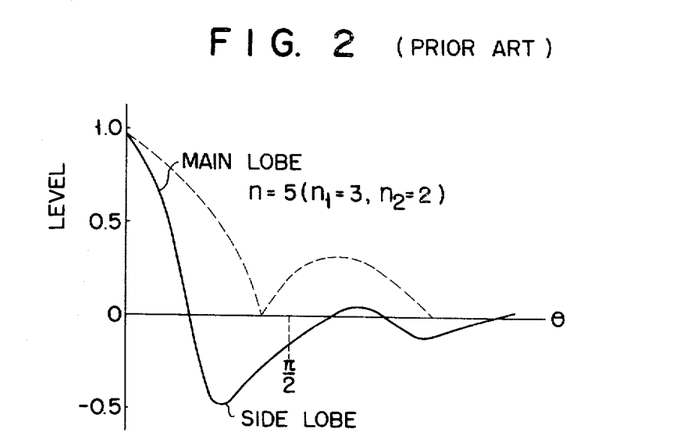
FIG. 2 shows a comparison between the theoretical directionality (indicated in a solid line) of the ultrasonic wave receiving apparatus of FIG. 1 obtained by applying a multiplicative circuit and theoretical directionality (presented in a broken line) of said apparatus when the multiplicative circuit is not used.

In FIG. 2, the abscissa shows the incidence angle of ultrasonic waves and the ordinate a relative directionality value. As apparent from FIG. 2, the main lobe of the directionality shown in a solid line has half the width of that indicated in a broken line. indeed but a side lobe having about half the level of the main lobe occurs on the negative side. An ideal directionality is demanded to be the type in which the level of the side lobe bears, a small ratio to that of the main lobe, and the main lobe itself is sufficiently narrow. However, the prior art has failed fully to meet these requirements.

It is accordingly the object of this invention to provide an ultrasonic wave receiving apparatus capable of displaying the directionality in which the main lobe has a width approximating a prescribed one and the side lobe has a fully small level.

An ultrasonic wave receiving apparatus according to this invention comprises an electroacoustic transducer array including a plurality of transducer elements arranged in a same plane so that any two adjacent transducer elements are spacially arranged at an integral multiple of a distance, the distance being determined from the equation $D/\lambda \sin \theta_1 = 1$ in which D represents the distance, $\lambda$ the wavelength of the receiving ultrasonic wave and $\theta_1$ the spacial angle between a main lobe and a grating lobe adjacent to the main lobe, the distance also being selected so as to cause the grating lobe to be outside of a predetermined scanning range which limits the maximum incident angle of the ultrasonic wave into the plane, and the main lobe and grating lobe together with the spacial angle being factors for determining a receiving directionality pattern of the apparatus; signal processing means which includes a multiplicative circuit, an extracting circuit for extracting the D.C. component of an output from the multiplicative circuit, a gain control circuit for setting gains of the outputs from the transducer array, and an adder, and processes an adder, and processes an output signal from each transducer element so as to cause the subject apparatus to indicate a receiving directionality pattern approximating a preset receiving directionality pattern; wherein the gain of the gain control circuit is set corresponding to the levels of the coefficients of the Fourier series into which the preset receiving directionality pattern is expanded as a function of the incident angle of the ultrasonic waves brought to the electroacoustic transducer array so as to approximate the directionality pattern to the preset receiving directionality pattern, thereby sharpening the main lobe and reducing the levels of side lobes generating between the main lobe and grating lobe.

This invention provides an ultrasonic wave receiving apparatus displaying the directionality in which the main lobe is sufficiently narrow and the level of the side lobe bears a small ratio to that of the main lobe, though the electro-acoustic transducer array may consist of a relatively small number of transducer elements. An ultrasonic wave receiving apparatus according to this invention can electrically scan a source of direct sounds or a source of indirect sound, for example, a spot from which ultrasonic waves are reflected and display the position of such source and the intensity of ultrasonic waves delivered therefrom, using, for example, a cathode ray tube. With the present ultrasonic wave receiving apparatus, the main lobe of the directionality is sufficiently narrow and the side lobe has a fully low level, preventing the occurrence of a false image and attaining a high capacity to detect the direction in which ultrasonic waves are brought to the apparatus.

Accordingly, the apparatus can be effectively used with, for example, an electric scanning type ultrasonic wave diagnosing apparatus.

This invention can be more fully understood from the following detailed description when taken in connection with reference to the accompanying drawings, in which.

Figure 3:
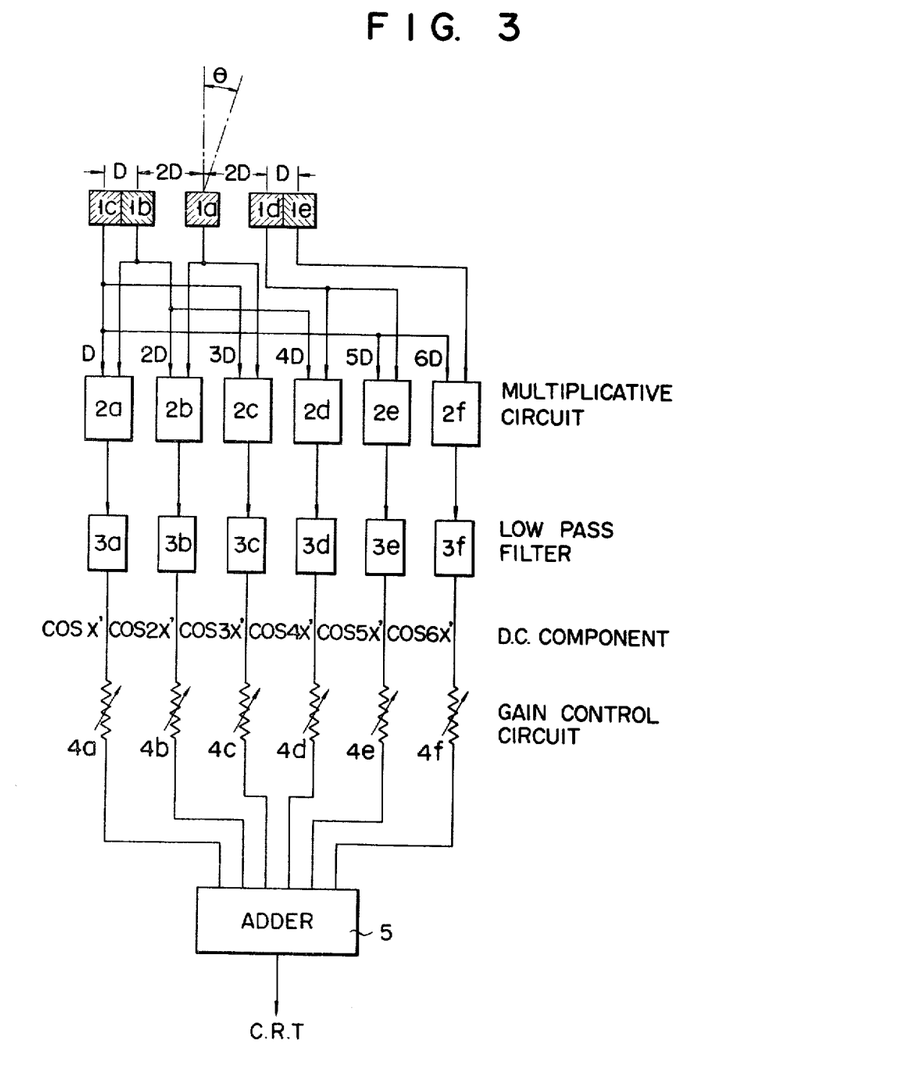
FIG. 3 is a circuit diagram of an ultrasonic wave receiving apparatus according to a first embodiment of this invention.

Referring to FIG. 3, the electroacoustic transducer array consists of a plurality of transducer elements $1e$, $1d$, $1a$, $1b$ and $1c$ linearly arranged in the same plane in the order mentioned. Any two of these transducer elements are spaced from each other at an integral multiple of a prescribed distance D as later referred to. Namely, the transducer elements $1e$ and $1d$, as well as the transducer elements $1b$ and $1c$, maintain a distance of one D, whereas the transducers $1d$ and $1a$, as well as the transducer elements $1a$ and $1b$ are spaced from each other at a distance of two D's. The character $\theta$ denotes the incidence angle of ultrasonic waves entering the subject apparatus. Multiplicative circuits $2a$ to $2f$ carry out the multiplication of outputs from various groups of transducer units as $(1c, 1b)$, $(1b, 1a)$, $(1c, 1a)$, $(1b, 1d)$, $(1c, 1d)$, and $(1c, 1e)$, namely, outputs from every two transducer elements spaced at distances of one D, two D's, three D's, four D's, five D's and six D's respectively. Low pass filters $3a$ to $3f$ only filter the later described D.C. component of outputs from the corresponding multiplicative circuits $2a$ to $2f$. Gain controlling circuits $4a$ to $4f$ control the gains of outputs from the corresponding low pass filters to the later described gain values. Outputs from the gain controlling circuits are added together by an adder 5. An output from the adder 5 indicates the directionality of the ultrasonic wave receiving apparatus of FIG. 3, and is conducted to, for example, a cathode ray tube for display.

Now, an ultrasonic wave entering the transducer elements $1e$ is designated as cos qt, and $x'$ is taken to denote a unit phase difference between the ultrasonic waves brought to all the transducer elements $1a$ to $1e$ and is expressed by the equation $X' = 2\pi D/\lambda \sin \theta$ in which $\lambda$ represents the wavelength of the ultrasonic wave incident into the transducer element arraying plane. Accordingly, ultrasonic waves conducted to the transducer elements $1d$, $1a$, $1b$ and $1c$ may be expressed as $\cos(qt - x')$, $\cos(qt - 3x')$, $\cos(qt - 5x')$ and $\cos(qt - 6x')$. Accordingly, an output from, for example, the multiplicative circuit $2a$ may be indicated as follows:

$$\cos(qt - 5x') \times \cos(qt - 6x') = \tfrac{1}{2}\{\cos x' + \cos(2qt + 11x')\} \ldots \quad (1)$$

When an output from the multiplicative circuit $2a$ expressed by the equation (1) above is conducted through the corresponding low pass filter $3a$, this filter $3a$ gives forth an output only consisting of a signal component denoted by the term $\cos x'$. Similarly when outputs from the multiplicative circuits $2b$ to $2f$ pass through the corresponding filters $3b$ to $3f$, then these filters produce outputs only consisting of signal components represented by the terms $\cos 2x'$, $\cos 3x'$, $\cos 4x'$, $\cos 5x'$ and $\cos 6x'$ respectively. In this invention, the signal components indicated by the above-mentioned $\cos x'$ to $\cos 6x'$ are hereinafter referred to as "D.C. components".

Figure 4:
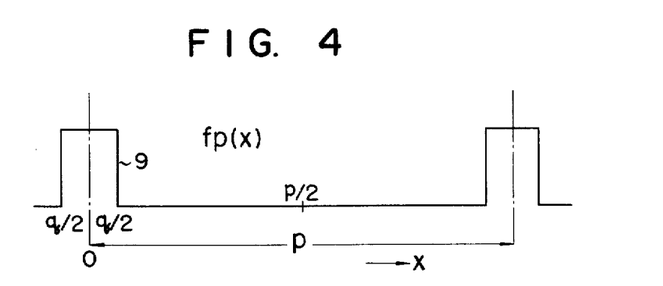
FIG. 4 indicates the prescribed directionality of the present apparatus of FIG. 3, on the basis of which the interrelationship of the constituent elements should be determined.

There will now be described the operation of the gain controlling circuits $4a$ to $4f$. The directionality of the subject ultrasonic wave receiving apparatus is first prescribed, as shown in FIG. 4, to have a repetitive spacial period p which corresponds to the angle between the main lobe and a grating lobe adjacent the main lobe and its main lobe 9 is chosen to have a width q. With the directionality designated as $fp(x)$ and expanded into a Fourier series, there results the following equation:

$$fp(x) = \frac{a_0}{2} + a_1 \cos \frac{2\pi}{p} x + a_2 \cos \frac{4\pi}{p} x + \ldots a_n \cos \frac{2n\pi}{p} x \quad (2)$$

where:

$$a_n = \frac{4}{p} \int_0^{\frac{q}{2}} fp(x) \cos \frac{2n\pi}{p} x\, dx \quad (3)$$

When, therefore, the function $fp(x)$ is defined, $a_0 \ldots a_n$ can be determined from the equation (3) above. Since $fp(x)$ is an even function, the following equations may be obtained with respect to the directionality of FIG. 4.

$fp(x) = 1 \ (0 \leq x \leq q/2)$ $fp(x) = 0 \ (q/2 \leq x < p/2)$

According to the above-mentioned embodiment of this invention, the gain of an output $\cos x'$ from the low pass filter $3a$ of FIG. 3 is set to a value equal to the coefficient $a_1$ of the term $\cos 2\pi/p\, x$ of the equation (2). Similarly, the gains of outputs from the low pass filters $3b$ to $3f$ are controlled to values equal to the coefficients of the corresponding terms of the Fourier series. The adder 5 adds together outputs from the gain controlling circuits $4a$ to $4f$, thereby obtaining a directionality 7 shown in a solid line in FIG. 5. $fp(x)$ of the equation (2) can be expanded into a series having an infinite number of terms. If, therefore, transducer elements, multiplicative circuits, low pass filters and gain controlling circuits are so arranged as to utilize the coefficients of as many serial terms as possible and outputs from said gain controlling circuits are added together, then the directionality of the ultrasonic wave receiving apparatus shown in FIG. 3 can be rendered more approximate to the prescribed directionality shown in FIG. 4.

Figure 6:
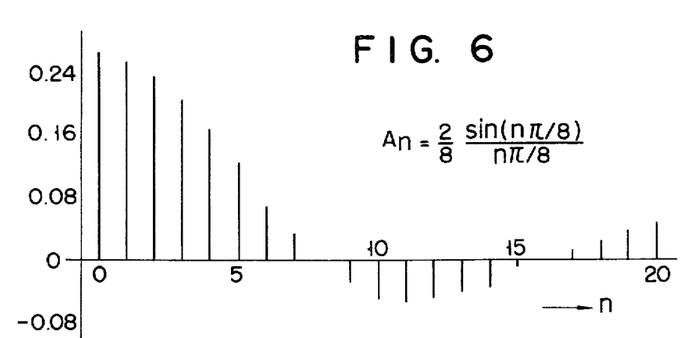
FIG. 6 presents a distribution of the calculated coefficients of the terms of the Fourier series into which the directionality of FIG. 4 is expanded.

FIG. 6 shows the distribution and level of the value of the coefficient $a_n$ determined from the equation (3) with respect to the prescribed directionality of FIG. 4. Since the above-mentioned embodiment refers to the case where $n$ represents an integer of 6, the gain controlling circuits 4a to 4f have their gains controlled to $a_1 = 0.24$, $a_2 = 0.23$, $a_3 = 0.20$, $a_4 = 0.16$, $a_5 = 0.12$ and $a_6 = 0.08$.

Figure 7A:
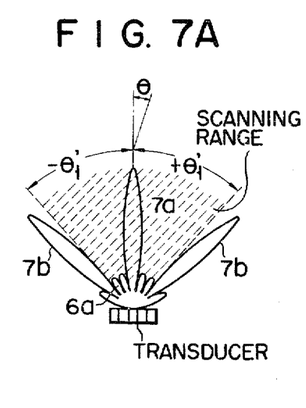
FIGS. 7A and 7B illustrate a principle for determining the prescribed interval at which there should be arranged the respective elements of an electroacoustic transducer assembly of the invention.
Figure 7B:
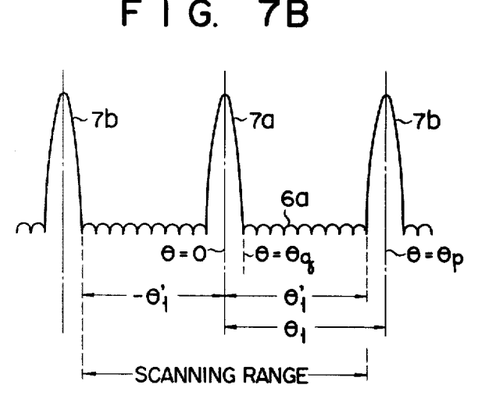

Referring to FIG. 7A and FIG. 7B, there will now be described the method of determining a prescribed distance D. In case $D > \lambda$ ($\lambda$ is wave length of ultrasonic wave), grating lobes (surplus main lobes) 7b appear at positions $x = \pm p$, $x = \pm 2p$ .... in proximity to a certain main lobe 7a. Since these grating lobes 7b give rise to a false image, it is necessary to define a scanning range or receiving angle so as to cause the grating lobes 7b to be thrown outside thereof. The reason is that if scanning is effected in such a manner as to include grating lobes in one scanning range, then the ultrasonic wave receiving apparatus will receive an ultrasonic wave brought in the direction in which the incidence angle $\theta 0$ stands at zero, as well as that transmitted in the direction in which the incidence angle represents $\theta_1$ with an equal sensitivity, failing to distinguish between these two ultrasonic waves. In other words, the ultrasonic wave entering the electroacoustic transducer array in the direction represented by incidence angle $\theta = \theta_1$ would be displayed on a cathode ray tube as if it were an ultrasonic wave brought to the transducer array in the direction denoted by incidence angle $\theta = 0$. FIG. 7A shows the case where scanning is made within a range defined between angles $\pm \theta'_1$ in order to let grating lobes 7b fall outside thereof. FIG. 7B presents the directionality of the subject ultrasonic wave receiving apparatus corresponding to FIG. 7A, indicating the interrelationship of the main lobe 7a whose control line is set at a point defining an angle $\theta = 0$, grating lobes 7b each positioned at a point defining an angle $\theta 2$, an angle $\theta = \theta q$ denoting half the width of the main lobe 7a and an angle $\theta'_1$ representing half the scanning range.

The incidence angle $\theta_1$ of an incoming ultrasonic wave which gives rise to first grating lobe 7b in proximity to a main lobe 7a may be expressed as follows, assuming $x = p$ (FIG. 4):

$D/\lambda \sin \theta_1 = 1$

From the above equation result the following equations:

$\sin \theta_1 = \lambda/D$ $\theta_1 = \sin^{-1} (\lambda/D)$

A maximum angle $\theta'_1$ at which scanning can be carried out within a range excluding a grating lobe 7b may be defined from FIG. 7B as follows:

$\theta'_1 = \theta_1 - \theta_q = \sin^{-1} (\lambda/D) - \theta_q$ $\theta'_1$ and $\theta_q$ denote angles derived from the prescribed directionality of FIG. 4 and $\lambda$ is a known factor, enabling the determination of the prescribed distance D.

In the case incidence angle $\theta$ is zero the scanning range can be taken as shown in FIG. 7A. If, however, incident angle $\theta$ is rendered to be $\frac{1}{2} \theta'_1$ the electronic sector scanning range without grating lobe in the range must be reduced to half that shown in FIG. 7A as the main lobe 7a is positioned at a position of one of the grating lobes 7b. If the apparatus of this invention is used for such sector scanning the above described distance D can be obtained from the equation $\frac{1}{2} \theta'_1 = \sin^{-1}(\lambda/D) - \theta_q$ As seen from FIG. 5, the side lobe 6 has a level about one-tenth of that of the main lobe 7, which has a width approximating that of the main lobe 9 of the prescribed directionality of FIG. 4.

The above-mentioned first embodiment of this invention refers to the case where six multiplicative circuits were used with five transducer units. However, the number of transducer elements and their arrangements defining a distance of two D's are not limited to those applied in said embodiment.

Figure 8:
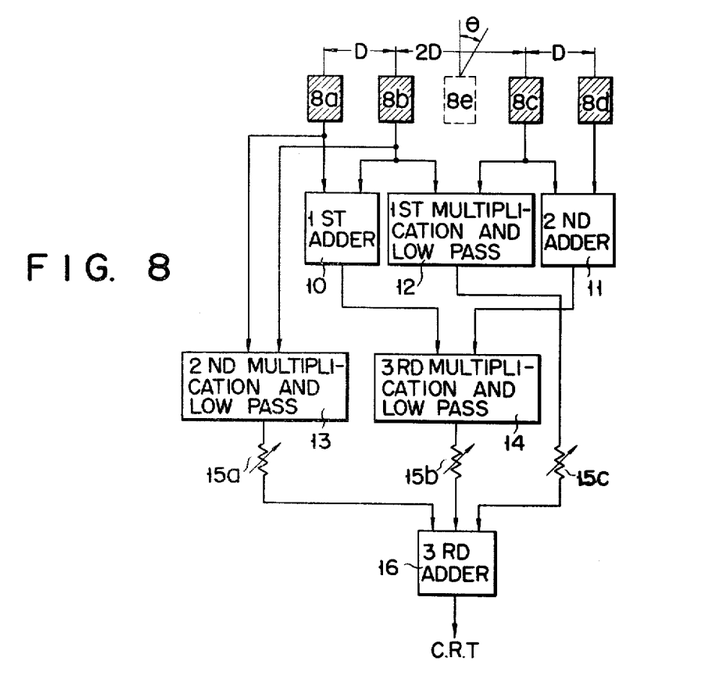
FIG. 8 is a block circuit diagram of an ultrasonic wave receiving apparatus according to a second embodiment of the invention.

Referring to an ultrasonic wave receiving apparatus according to a second embodiment of this invention shown in FIG. 8, transducer elements 8a, 8b, 8c and 8d are linearly arranged in the order mentioned at the following intervals. Namely, two transducer elements 8a and 8b, as well as two transducer elements 8c and 8d are spaced from each other at a distance of one D, while two transducers 8b and 8c are maintained at an interval of two D's. For convenience of description, an imaginary transducer unit 8e is indicated. Now, the incidence angle at which an ultrasonic wave enters said imaginary transducer unit 8e is designated as $\theta$. A first adder 10 adds together outputs from the transducer units 8a and 8b, and a second adder 11 adds together outputs from the transducer units 8c and 8d. A first multiplicative circuit 12 multiplies outputs from the transducer units 8b and 8c, and a second multiplicative circuit 13 multiplies outputs from the transducer units 8a and 8b, a third multiplicative circuit 14 multiplies outputs from the first and second adders 10 and 11. The first to third multiplicative circuits each include a low pass filter for extracting the D.C. component of an output derived from multiplication. There are provided gain controlling circuits 15a, 15b and 15c for controlling gain by reference to the coefficients of the terms of the Fourier series into which the prescribed directionality of FIG. 4 has been developed. These gain controlling circuits 15 a, 15b and 15c are connected to the output terminals of the second multiplicative circuit 13, third multiplicative circuit 14 and first multiplicative circuit 12 respectively. Outputs from the gain controlling circuits 15a, 15b and 15c are added together by a third adder 16.

With an ultrasonic wave entering the imaginary transducer unit 8e designated as cos qt, ultrasonic waves brought to the transducer units 8b, 8a, 8c and 8d may be expressed as $\cos(qt - x')$, $\cos(qt - 2x')$, $\cos(qt + x')$ and $\cos(qt + 2x')$. Accordingly, the third multiplicative circuit 14 for multiplying outputs from the adders 10 and 11 produces the result of multiplication indicated as follows: $\{\cos(qt - x') + \cos(qt - 2x')\} \times \{\cos(qt + x') + \cos(qt + 2x')\} = 2 \cos^2 x'(\cos 2qt + \cos 3x')$ Due to the presence of a low pass filter, only a signal component $2 \cos^2 x'/2 \cos 3x'$ is extracted, namely there is obtained an output expressed as $2 \cos^2 x'/2 \cos 3x' = 2(1 + \cos x'/2) \cos 3x' = \frac{1}{2}(\cos 4x' + 2 \cos 3x' + \cos 2x') \ldots$ (4)

Similarly, the second multiplicative circuit 13 produces an output indicated as $$\tfrac{1}{2} \cos x' \qquad (5)$$

The first multiplicative circuit 12 gives forth an output expressed as $$\tfrac{1}{2} \cos 2x' \qquad (6)$$

The second embodiment of FIG. 8 refers to the case where four terms of the Fourier series were used. In this case, the coefficients of said terms are $a_1 = 0.37$, $a_2 = 0.30$, $a_3 = 0.21$ and $a_4 = 0.10$. While the values of the coefficients $a_3$ and $a_4$ are obtained simply from the gain value of an output from the third multiplicative circuit 14, the value of the coefficient $a_2$ is arrived at by having a sum of the gain value of an output from the third multiplicative circuit 14 and the gain value of an output from the first multiplicative circuit 12 controlled by the gain controlling circuit 15c. The value of the coefficient $a_1$ is determined through control by the gain controlling circuit 15a. The above-mentioned multiplicative circuits may be replaced by phase detecting circuits.

If multiplicative circuits and low pass filters are used in an increasing number with transducer elements provided in a prescribed number, then the operation circuits will present more uneven properties, deteriorating the linearity of outputs from signal processing circuits, namely the directionality of an ultrasonic wave receiving apparatus as a whole.

Figure 9:
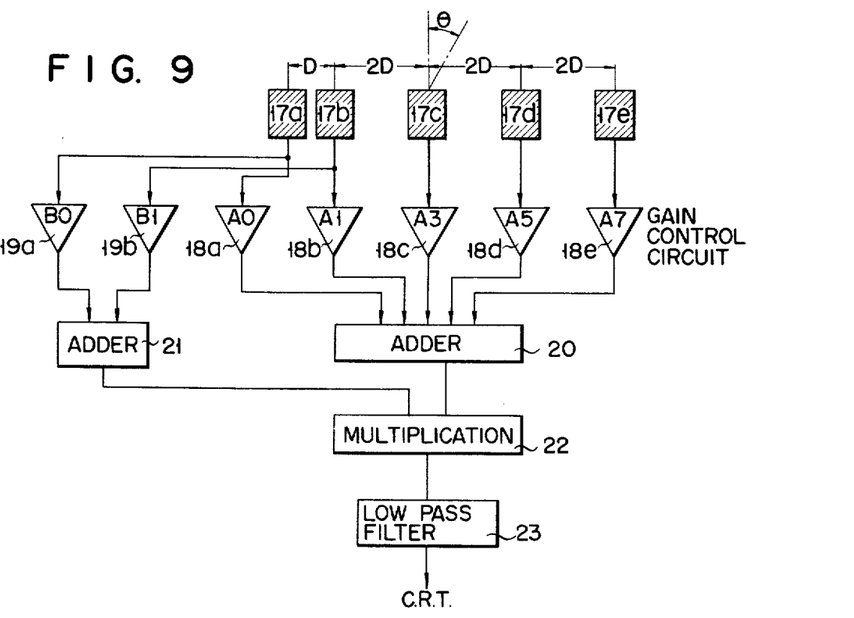
FIG. 9 is a block circuit diagram of said apparatus according to a third embodiment of the invention.

The third embodiment of FIG. 9 includes a signal processing circuit capable of utilizing the coefficients of a larger number of the terms of the Fourier series into which the prescribed directionality is expanded, by means of multiplicative circuits and low pass filters provided in a fixed number.

Referring to FIG. 9, transducer elements 17a to 17e are linearly arranged in the order mentioned. The transducer elements 17a and 17b are spaced from each other at a distance of one D. The distance between the adjacent ones of the transducer elements 17b, 17c, 17d and 17e is two D's. The gain controlling circuits 18a to 18e control the gains of outputs from the corresponding transducer elements to $A_0$, $A_1$, $A_3$, $A_5$ and $A_7$. This gain control operation includes, if required, the inversion of phases. The gains of outputs from the transducer elements 17a and 17b are controlled to $B_0$ and $B_1$ respectively by the corresponding gain controlling circuits 19a and 19b. Obviously, the values of gains thus controlled are determined by reference to the coefficients of the terms of the Fourier series into which the prescribed directionality is expanded. Outputs from the gain controlling circuits 18a to 18e are added together by an adder 20, while outputs from the gain controlling circuits 19a and 19b are added together by an adder 21. Outputs from the adders 20 and 21 are multiplied by a multiplicative circuit 22. A low pass filter 23 extracts the D.C. component of an output from the multiplicative circuit 22. The D.C. component thus extracted is conducted to, for example, a cathode ray tube.

With an ultrasonic wave entering the transducer elements 17a designated as cos wt, ultrasonic waves brought to the transducer elements 17b to 17e may be expressed as $\cos(wt - x')$, $\cos(wt - 3x')$, $\cos(wt - 5x')$ and $\cos(wt - 7x')$ respectively. $x'$ denotes, as previously described, a unit phase difference between the ultrasonic waves brought to the transducer elements 17a to 17e and is expressed by the equation $X' = 2\pi D/\lambda \sin \theta$. Accordingly, an output from the adder 20 may be expressed by the following equation:

$$\{A_0\cos wt + A_1\cos(wt - x') + A_3\cos(wt - 3x') + A_5\cos(wt - 5x') + A_7\cos(wt - 7x')\} \qquad (7)$$

An output from the adder 21 may be indicated by the following equation:

$$\{B_0\cos wt + B_1\cos(wt - x')\} \qquad (8)$$

Outputs represented by the equations (7) and (8) above are multiplied by the multiplicative circuit 22 to have the D.C. component alone extracted by the low pass filter 23, which in turn gives forth an output expressed by the following formula:

$$(A_0B_0 + A_1B_1) + (A_0B_1 + A_1B_0)\cos x' + A_3B_1 \cos 2x' + A_3B_0 \cos 3x' + A_5B_1 \cos 4x' + A_5B_0 \cos 5x' + A_7B_1 \cos 6x' + A_7B_0 \cos 7x' \qquad (9)$$

There will now be described the method of controlling the gains of outputs from the transducer elements 17a to 17e to the value of $A_0$, $A_1$, $A_3$, $A_5$, $A_7$, $B_0$ and $B_1$. First, the values of the coefficients $a_0$ to $a_7$ of the terms of the Fourier series are determined from the aforesaid equation (3). These coefficients correspond to the terms of the formula (9) above as follows:

$$\begin{aligned}
a_0 &= A_0B_0 + A_1B_1 \\
a_1 &= A_0B_1 + A_1B_0 \\
a_2 &= A_3B_1 \\
a_3 &= A_3B_0 \\
a_4 &= A_5B_1 \\
a_5 &= A_5B_0 \\
a_6 &= A_7B_1 \\
a_7 &= A_7B_0
\end{aligned} \qquad (10)$$

If it is difficult accurately to determine the values of the coefficients of the terms of the Fourier series, approximations thereto may be permissibly used. With said approximation designated as $a'_0$ to $a'_7$, let the following equations be assumed:

$a'_0 = 0.12$
$a'_1 = 0.24$
$a'_2 = 0.24$
$a'_3 = 0.20$
$a'_4 = 0.16$
$a'_5 = 0.13$
$a'_6 = 0.06$
$a'_7 = 0.05$

Then, the values of controlled gains may be indicated as follows:

$A_0 = 0.38$
$A_1 = -0.22$
$A_3 = 0.20$
$A_5 = 0.13$
$A_7 = 0.05$
$B_0 = 1.0$
$B_1 = 1.2$

Figure 5:
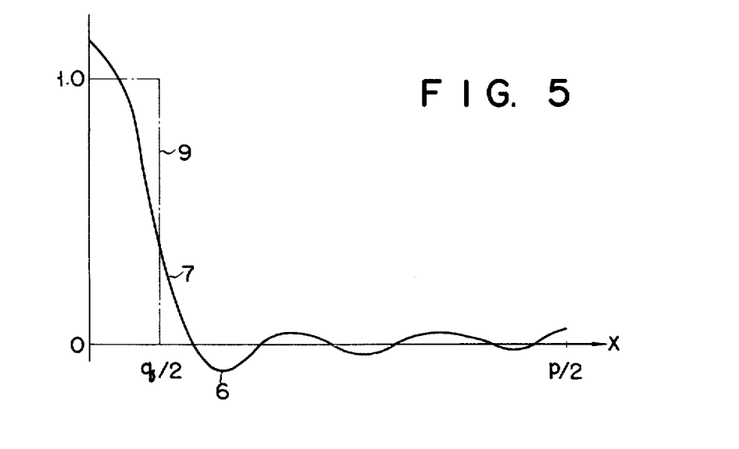
FIG. 5 shows the theoretical directionality of the apparatus of FIG. 3, which approximates that of FIG. 4.
Figure 10:
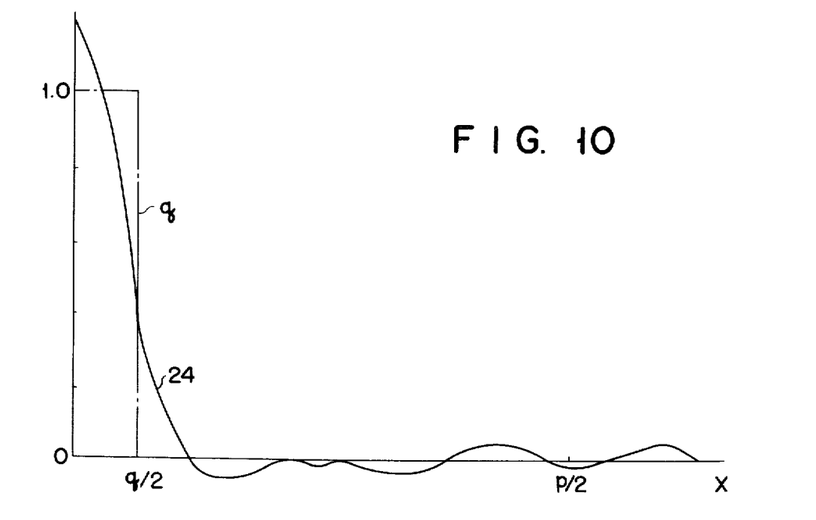
FIG. 10 indicates the directionality of the apparatus of FIG. 9 which closely resembles the prescribed pattern of FIG. 4.

In this case, the directionality of the subject ultrasonic wave receiving apparatus may be represented by the solid line 24 of FIG. 10, which shows that the side lobe has a level about one-twentieth of that of the main lobe and the main lobe itself has a width closely approximating that of the main lobe of the prescribed directionality (refer to the numeral 9 of FIG. 4 or FIG. 5).

Figure 11:
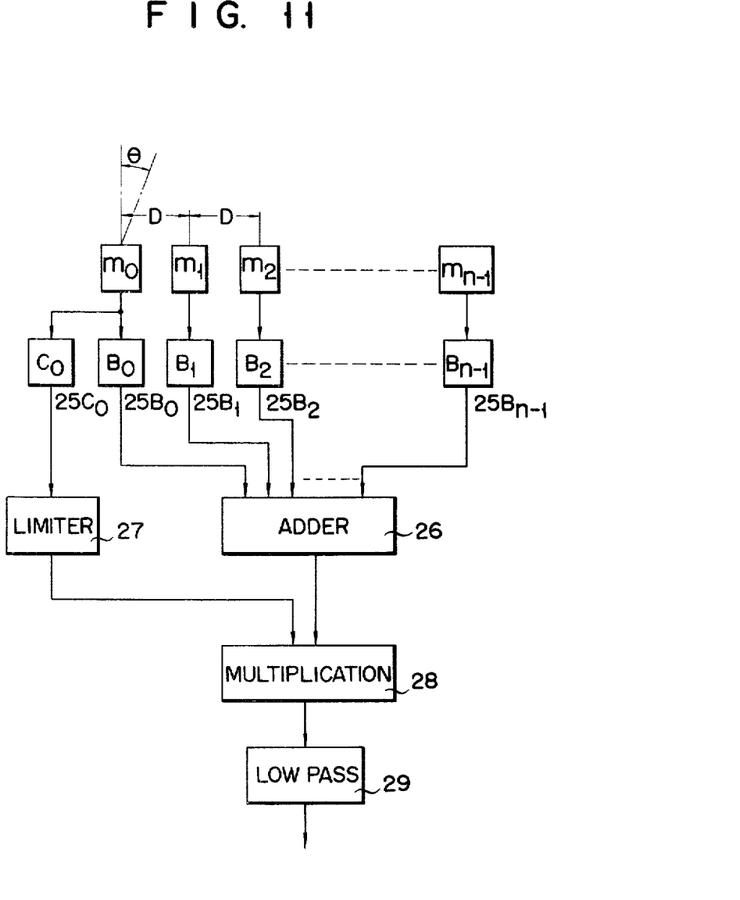
FIG. 11 is a block circuit diagram of said apparatus according to a fourth embodiment of the invention.

FIG. 11 is a block circuit diagram of an ultrasonic wave receiving apparatus according to a fourth embodiment of this invention. According to this embodiment, transducer elements $m_0$ to $m_{n-1}$ having a number of n are linearly arranged at an equal distance D. Amplifiers $25B_0$ to $25B_{n-1}$ whose output gains are controlled to $B_0$ to $B_{n-1}$ are connected to the corresponding transducer elements $m_0$ to $m_{n-1}$. Outputs from the amplifiers $25B_0$ to $25B_{n-1}$ are added together by an adder 26. An output from the transducer element $m_0$ is amplified by an amplifier $25C_0$, and the amplitude of an output from said amplifier $25C_0$ is limited by a limiter 27. An output from the adder 26 and an output from the limiter 27 are multiplied by a multiplicative circuit 28. A low pass filter 29 extracts the D.C. component of an output from the multiplicative circuit 28, obtaining an output denoting the directionality of the subject ultrasonic wave receiving apparatus. As in the preceding embodiments, the gains of outputs from the amplifiers are determined by reference to the values of the coefficients of the terms of the Fourier series, into which the prescribed directionality of FIG. 4 is expanded. In this connection, it may be contemplated to provide a first adder for adding together outputs from transducer elements after controlling the gains thereof and a second adder for adding outputs from transducer elements after controlling the gains thereof to different values from those used in the preceding case, multiply outputs from the first and second adders and finally extract the D.C. component of an output resulting from said multiplication. According to this process, the multiplicative circuit multiplies outputs from the first and second adders or input signals to said multiplicative circuit. If, in this case, the amplitude of said input signals varies over a broad range (the range of amplitude variation is hereinafter referred to as "a dynamic range"), a dynamic range associated with the multiplicative circuit and its output circuit will also have to become considerably wide. For example, where signals received have a dynamic range of 40 dB to 70 dB, then the output circuit will be required to have as broad a dynamic range as 80 dB to 140 dB. With an ordinary electric circuit, however, such a large dynamic range is difficult to realize. Further, an output signal from said output circuit has as large a voltage as a square of the voltage of an input signal conducted to said output circuit and does not bear any proportion to the input signal. Where, however, an output from the amplifier $25C_0$ has its amplitude limited by the limiter 27 after being fully amplified, then the multiplicative circuit 28 is only supplied with information on the phase, because an input signal to one of the input terminals of said circuit 28 has its amplitude already fixed by the above-mentioned limitation. Therefore, the fourth embodiment of FIG. 11 has the advantage of reducing a dynamic range associated with the multiplicative circuit 28 and an output circuit included therein, making an output from said output circuit proportionate to an input thereto and displaying its prominent properties particularly when used with an ultrasonic wave diagnosing device.

What we claim is:

1. An ultrasonic wave receiving apparatus comprising:

an electroacoustic transducer array including a plurality of transducer elements arranged in the same plane so that any two adjacent transducer elements are spacially arranged at an integral multiple of a distance, said distance being determined from the equation $D/\lambda \sin \theta_1 = 1$ in which D represents said distance, $\lambda$ the wave length of the receiving ultrasonic wave and $\theta_1$ the spacial angle between a main lobe and a grating lobe adjacent to said main lobe, said distance also being selected so as to cause said grating lobe to be outside of a predetermined scanning range which limits the maximum incident angle of said ultrasonic wave into said plane, and said main lobe and grating lobe together with said spacial angle being factors for determining a receiving directionality pattern of said apparatus; and signal processing means which includes a multiplicative circuit, an extracting circuit for extracting the D.C. component of an output from said multiplicative circuit, a gain control circuit for setting gains of the outputs from said transducer array, and an adder, and means for processing an output signal from each transducer element so as to cause the subject apparatus to indicate a receiving directionality pattern approximating a preset receiving directionality pattern; wherein the gain of said gain control circuit is set corresponding to the levels of the coefficients of the Fourier series into which said preset receiving directionality pattern is expanded as a function of the incident angle of the ultrasonic waves brought to said electroacoustic transducer array so as to approximate said receiving directionality patterns to said preset receiving directionality pattern, thereby sharpening said main lobe and reducing the levels of side lobes generating between said main lobe and grating lobe.

2. An ultrasonic wave receiving apparatus according to claim 1 wherein the signal processing means comprises a plurality of multiplicative circuits each multiplying outputs from any two of the transducer elements constituting the electroacoustic transducer array which are arranged at different intervals; a plurality of extracting circuits for extracting the D.C. component of outputs from the multiplicative circuits; a plurality of gain controlling circuits for setting the gains of outputs from the extracting circuits to values equal to the values of the coefficients of those terms of the Fourier series which correspond to said outputs; and an adder for adding together outputs from the gain controlling circuits.

3. An ultrasonic wave receiving apparatus according to claim 1 wherein the electroacoustic transducer array consists of a first to a fourth transducer element, the first and second transducer elements, as well as the third and fourth transducer elements, being spaced from each other at the selected distance and the second and third transducer elements being spaced from each other at twice the selected distance; and the signal processing means comprises a first adder for adding together outputs from the first and second transducer elements, a second adder for adding together outputs from the third and fourth transducer elements, a first multiplicative and extracting circuit for multiplying outputs from the second and third transducer elements and extracting the D.C. component of the multiplied outputs, a second multiplicative and extracting circuit for multiplying outputs from the first and second transducer elements and extracting the D.C. component of the multiplied outputs, a third multiplicative and extracting circuit for multiplying outputs from the first and second adders and extracting the D.C. component of the multiplied outputs gain control, circuits for setting the gains of outputs from the first, second and third multiplicative and extracting circuits, and a third adder for adding together outputs from the gain controlling circuits.

4. An ultrasonic wave receiving apparatus according to claim 1 wherein the electroacoustic transducer array consists of a first to an $n$ order transducer element arranged in succession, the first and second transducer elements being spaced from each other at the selected distance and every adjacent ones of the second to the $n$ order transducer elements being spaced from each other at twice the selected distance; the signal processing means comprises a first to an $n$ order gain controlling circuit for setting the gains of the outputs from the respective transducer elements, gain controlling circuits of the $(n + 1)$ and $(n + 2)$ orders for setting the gains of outputs from the first and second transducer elements, a first adder for adding together outputs from the first to the $n$ order gain controlling circuits, a second adder for adding together outputs from the gain controlling circuits of the $(n + 1)$ and $(n + 2)$ orders, a multiplicative circuit for multiplying outputs from the first and second adders, and an extracting circuit for extracting the D.C. component of outputs from the multiplicative circuit.

5. An ultrasonic wave receiving apparatus according to claim 1 wherein the electroacoustic transducer array consists of a first to an n order transducer element arranged in succession at the selected distance; and the signal processing means comprises a first to an $n$ order gain controlling circuit for setting the gains of outputs from the respective transducer elements, an amplifier for amplifying output from the first transducer element, an adder for adding together outputs from the first to the n order gain controlling circuits, a limiter for limiting the amplitude of output from the amplifier, a multiplicative circuit for multiplying outputs from the limiter and adder, and an extracting circuit for extracting the D.C. component of outputs from the multiplicative circuit.

* * * * *